United States Patent
Ikuta et al.

(10) Patent No.: US 11,662,647 B2
(45) Date of Patent: May 30, 2023

(54) PHASE SYNCHRONIZATION METHOD AND PHASE SYNCHRONIZATION DEVICE

(71) Applicant: Nippon Telegraph and Telephone Corporation, Tokyo (JP)

(72) Inventors: Takuya Ikuta, Musashino (JP); Takahiro Inagaki, Musashino (JP); Kensuke Inaba, Musashino (JP); Toshimori Honjo, Musashino (JP); Hiroki Takesue, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/637,358

(22) PCT Filed: Aug. 28, 2019

(86) PCT No.: PCT/JP2019/033756
§ 371 (c)(1),
(2) Date: Feb. 22, 2022

(87) PCT Pub. No.: WO2021/038765
PCT Pub. Date: Mar. 4, 2021

(65) Prior Publication Data
US 2022/0291568 A1  Sep. 15, 2022

(51) Int. Cl.
*G02F 1/39* (2006.01)
*G02F 2/00* (2006.01)
*G02F 3/00* (2006.01)

(52) U.S. Cl.
CPC .................. *G02F 1/39* (2013.01); *G02F 2/00* (2013.01); *G02F 3/00* (2013.01)

(58) Field of Classification Search
CPC .................. G02F 1/39; G02F 2/00; G02F 3/00
See application file for complete search history.

(56) References Cited

U.S. PATENT DOCUMENTS 8,331,802 B2 * 12/2012 Fujii ..................... H04B 10/61
  398/203
9,423,819 B2 * 8/2016 Marandi ................ B82Y 10/00
(Continued)

FOREIGN PATENT DOCUMENTS

WO  2017-047666 A1  3/2017
WO  2019-078354 A1  4/2019

OTHER PUBLICATIONS

Takahiro Inagaki et al., *A Coherent Ising Machine for 2000-Node Optimization Problems*, Science, vol. 354, 2016, pp. 603-606.

*Primary Examiner* — Daniel Petkovsek
(74) *Attorney, Agent, or Firm* — Workman Nydegger

(57) ABSTRACT

The present invention provides an optical phase synchronization method characterized by involving applying a small phase modulation signal (dither signal) to local oscillator light, acquiring an error signal that is dependent on a phase shift, and controlling the phase shift. The present invention further provides an optical phase synchronization method characterized by involving inducing a specific phase pattern in dummy pulses in an optical resonator using injection light, applying phase modulation to the local oscillator light, and thereby acquiring a part of the measurement result of the dummy pulses as the error signal. The present invention is further characterized by arranging calculation pulses and phase synchronization dummy pulses in a distributed manner (for example, alternately) and increasing a pulse width using a narrow band electrical filter.

8 Claims, 17 Drawing Sheets

(56) References Cited

U.S. PATENT DOCUMENTS

| | | | |
|---|---|---|---|
| 9,830,555 B2* | 11/2017 | Marandi | ................... G06N 5/01 |
| 10,254,438 B2* | 4/2019 | Bhongale | ........... G01D 5/35361 |
| 2018/0246393 A1 | 8/2018 | Inagaki et al. | |
| 2021/0088873 A1 | 3/2021 | Inagaki et al. | |

* cited by examiner

PHASE SYNCHRONIZATION METHOD AND PHASE SYNCHRONIZATION DEVICE

TECHNICAL FIELD

The present disclosure relates to a phase synchronization approach of homodyne detection for a calculator using a degenerate optical parametric oscillator.

BACKGROUND ART

As the calculator using a degenerate optical parametric oscillator, there is a coherent Ising machine, for example (PTLs 1 to 2, NPL 1). This is a device that uses optical pulses and simulates an Ising model in a pseudo manner to solve a combinatorial optimization problem such as a nondeterministic polynomial time (NP) problem. However, for the device, there has been a problem in that when an output pulse of the degenerate optical parametric oscillator is measured, a relative phase shift between the output pulse and local oscillator light used for the measurement occurs, resulting in change of calculation accuracy each time. To mitigate the variance, a small problem, in which the correct solution has been found, and a problem to be actually solved, in which the correct solution is unknown, are simultaneously calculated a large number of times, and only when the correct answer is obtained for the problem in which the correct solution has been found, an answer of the target problem is picked up. In this manner, the calculator outputs a solution with high accuracy calculated with the phase close to the correct phase (PTL 2).

CITATION LIST

Patent Literature

PTL 1: WO 2017-047666
PTL 2: WO 2019-078354

Non Patent Literature

NPL 1: Takahiro Inagaki et al., "A coherent Ising machine for 2000-node optimization problems", SCIENCE, 2016, pp. 603-606, Vol. 354.

SUMMARY OF THE INVENTION

There has been a problem in that when an output pulse of the degenerate optical parametric oscillator is measured, a relative phase shift between the output pulse and local oscillator light used for the measurement occurs, resulting in change in calculation accuracy each time. For this reason, an approach has been taken in which example problems are solved simultaneously and a solution when the correct solution for the example problem is obtained is adopted, which has been inefficient.

The present disclosure includes the following configurations in order to solve such a problem.

A phase synchronization method of the present disclosure includes: inputting local oscillator light and an optical pulse of an optical parametric oscillator to a first input unit and a second input unit of an optical homodyne detector, respectively; using an optical homodyne detection signal of the optical homodyne detector to acquire an error signal; and adding a phase modulation signal to the local oscillator light to control a phase shift between the local oscillator light and the optical pulse of the optical parametric oscillator.

A phase synchronization device of the present disclosure includes: an optical homodyne detector into which local oscillator light and an optical pulse of an optical parametric oscillator are input from a first input unit and a second input unit, respectively; a lock-in amplifier configured to use an optical homodyne detection signal from the optical homodyne detector to output an error signal; and a phase controller provided between the first input unit and the optical homodyne detector and configured to acquire the error signal and add a phase modulation signal to the local oscillator light to control a phase shift.

In the phase synchronization method and the phase synchronization device according to the present disclosure, phase synchronization is stabilized and phase measurement accuracy is improved, so that a solution with high quality is always output.

BRIEF DESCRIPTION OF DRAWINGS

FIG. 2($b$) is a diagram illustrating a signal when the phase is synchronized.
FIG. 2($c$) is a diagram illustrating a signal when a phase is shifted slightly in a positive direction.
FIG. 2($d$) is a diagram illustrating a signal when the phase is shifted slightly in a negative direction.

DESCRIPTION OF EMBODIMENTS

Figure 1:
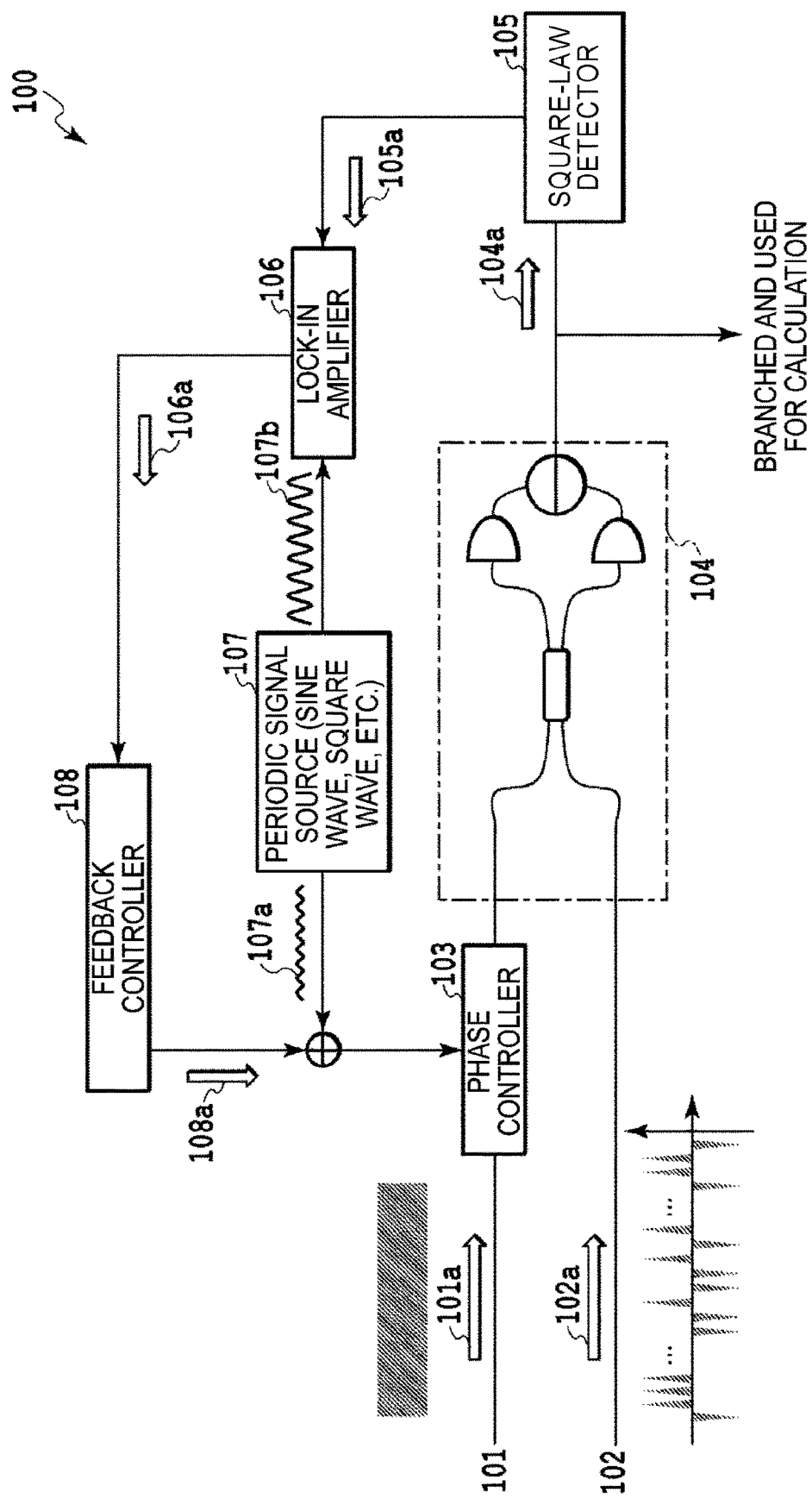
FIG. 1 is a diagram illustrating an example of a phase synchronization device when a small dither signal is used.

Hereinafter, a phase synchronization method and a phase synchronization device of embodiments of the present invention will be described in detail.

First Embodiment

In the present embodiment, as a first phase synchronization approach, phase stabilization using a small dither signal 107$a$ will be described with reference to FIG. 1.

An approach will be described in which phase modulation is performed for local oscillator light 101a in optical homodyne detection at a phase controller 103 using the small dither signal 107a, which is a continuous periodic signal (sine wave, square wave, or the like) of an angular frequency $\omega_d$ and has a small amplitude, and feedback to the local oscillator light 101a is performed based on an error signal (a low frequency error signal 106a) obtained by performing lock-in detection between a signal obtained by further subjecting an optical homodyne detection signal to a square-law detector 105 (an intermediate-frequency intensity signal 105a having the same carrier frequency as that of a periodic signal source 107) and a continuous periodic signal 107b to stabilize a relative phase.

A phase synchronization device 100 that uses the present embodiment will be described. The phase synchronization device 100 includes an optical homodyne detector 104, the square-low detector 105, the periodic signal source 107, a lock-in amplifier 106, and a feedback controller 108, as described below. Here, the optical homodyne detector 104 is configured to receive, as an input, the local oscillator light 101a, which is continuous light, from a first input unit 101 via the phase controller 103, receive, as an input, an output pulse 102a of an optical parametric oscillator (OPO) from a second input unit 102, and output a high frequency signal 104a having about a pulse repetition frequency. The square-law detector 105 receives, as an input, the high frequency signal 104a having about the pulse repetition frequency to output the intermediate frequency intensity signal 105a having the same carrier frequency as that of the periodic signal source 107. The periodic signal source 107 generates a periodic signal such as a sine wave or a square wave. The lock-in amplifier 106 receives, as inputs, the continuous periodic signal 107b from the periodic signal source 107 and the intermediate frequency intensity signal 105a having the same carrier frequency as that of the periodic signal source and outputs the low frequency error signal 106a. The feedback controller 108 receives, as an input, the low frequency error signal 106a and outputs a feedback signal for synchronization. Here, the phase controller 103 is configured to receive, as inputs, the small dither signal 107a generated by the periodic signal source 107 and the feedback signal for synchronization 108a. Note that the high frequency signal 104a having about the pulse repetition frequency is branched and used for calculation.

Specifically, the following procedure is performed.

Figure 2:
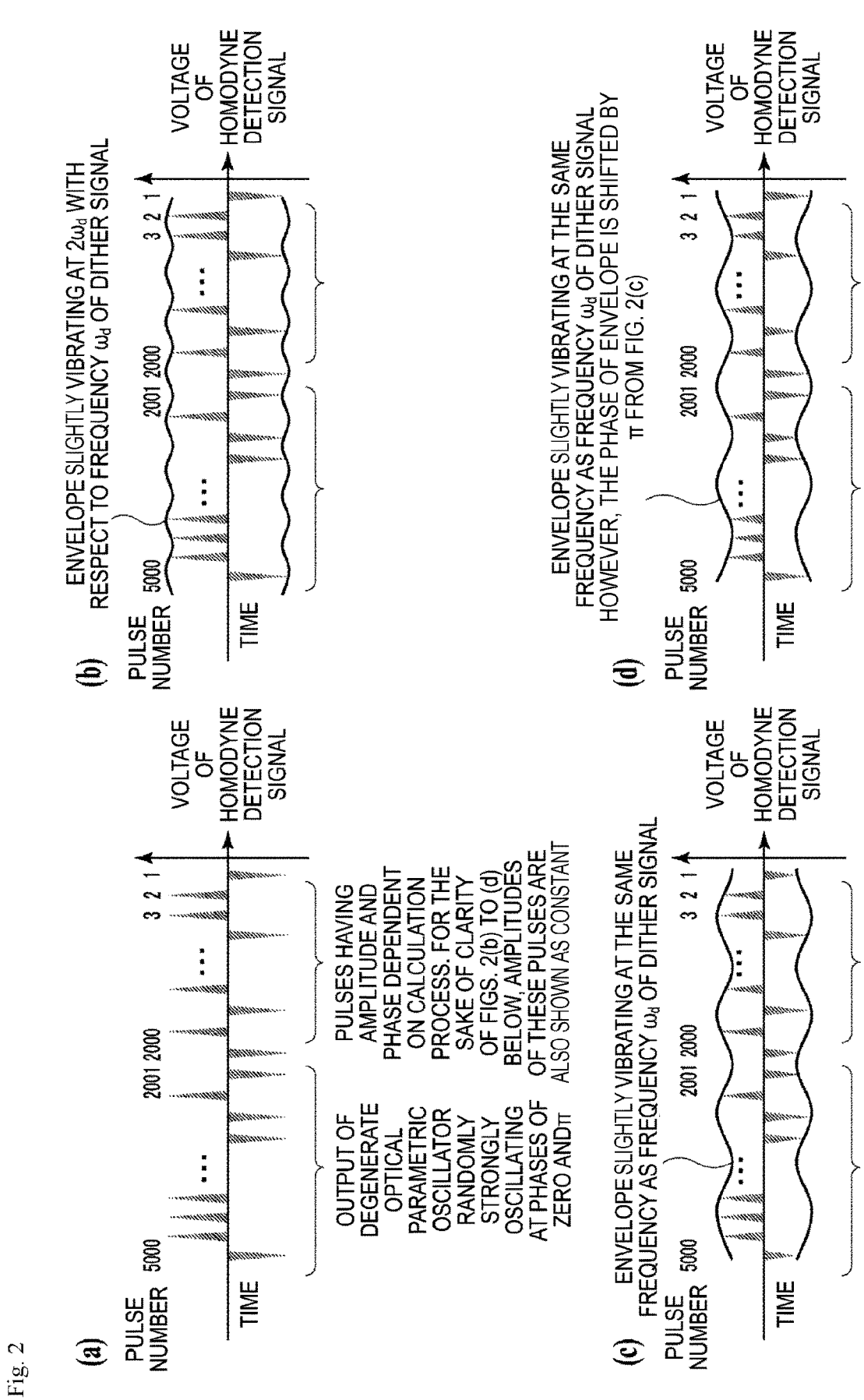
FIG. 2($a$) is a diagram illustrating a homodyne detection signal to be acquired in ideal case.

As illustrated in FIG. 1, $E_{LO}e^{i(\omega t+\theta)}$ of the local oscillator light (continuous light) 101a and $E_s e^{i\omega t}$ of an output pulse (OPO pulse) 102a of the degenerate optical parametric oscillator are input to two input units, that is, the first input unit 101 and the second input unit 102 of the optical homodyne detector, respectively. Here, the real numbers $E_{LO}>0$ and $E_s=\pm E_{opo}(E_{opo}>0)$ represent amplitudes of the local oscillator light 101a and the output pulse 102a of the degenerate optical parametric oscillator, w represents an angular frequency of light, t represents time, and $\theta$ represents a relative phase between the local oscillator light 101a and the output pulse 102a of the degenerate optical parametric oscillator. However, it is assumed that dummy pulses (see FIG. 4 and PTL 1), which accounts for a lot of the output pulses 102a of the degenerate optical parametric oscillator, sufficiently strongly oscillate and have a constant intensity and a phase of zero or $\pi$. At this time, an output signal of each pulse from the optical homodyne detector is represented as $2E_{LO}E_s \cos\theta$. In particular, when $\theta=0$ holds, an ideal homodyne detection signal is obtained as in FIG. 2(a).

FIG. 2(a) illustrates a homodyne detection signal that is desired to be actually acquired, with a voltage of the homodyne detection signal as the vertical axis and time as the horizontal axis. Pulse numbers 1 to 2000 indicate pulses each having an amplitude and a phase dependent on a calculation process. Note that, for the sake of clarity in FIGS. 2(b) to 2(d) below, amplitudes of these pulses are also shown to be constant. Pulse numbers 2001 to 5000 indicate outputs of the degenerate optical parametric oscillator that strongly oscillates at the phases of zero or 7C randomly.

When a signal from the optical homodyne detector 104 (the high frequency signal 104a having about the pulse repetition frequency) is input to the square-law detector 105, an output signal of $(2E_{LO}E_s \cos\theta)^2 = 2E_{LO}^2 E_s^2 (1+\cos 2\theta)$ (the intermediate frequency intensity signal 105a having the same carrier frequency as that of the periodic signal source 107) is obtained. Note that the high frequency signal 104a having about the pulse repetition frequency is branched and used for calculation.

A signal with a small amplitude a (a>0) and an angular frequency $\omega_d$ (also referred to as the small dither signal 107a) is applied to the local oscillator light 101a to perform phase modulation. When a steady phase shift between the local oscillator light 101a and the OPO optical pulse 102a is $\delta$, the phase difference $\theta$ described above can be expressed as $\theta=\delta+a \sin\omega_d t$.

When it is assumed that the amplitude a of the small dither signal 107a is sufficiently small, out of output signals of the square-law detector 105, a component proportional to $\cos 2\theta$ can be expanded as $2E_{LO}^2 E_s^2(\cos 2\delta - 2a \sin 2\delta \sin\omega_d t - 2a^2 \cos 2\delta \sin^2 \omega_d t)$. When $\delta=0$ holds, the second term is zero, and an envelope of the homodyne detection signal becomes an envelope that microvibrates mainly at an angular frequency of $2\omega_d$ as in FIG. 2(b).

FIG. 2(b) illustrates a signal when the phase is synchronized with a voltage of the homodyne detection signal as the vertical axis and time as the horizontal axis. A wavy line indicates an envelope that vibrates slightly at $2\omega_d$ with respect to the frequency $\omega_d$ of the dither signal 107a.

On the other hand, when a phase difference of light is in the vicinity of $\delta=0$, the envelope of the homodyne detection signal becomes an envelope that vibrates at the angular frequency $\omega_d$ and with a phase dependent on the direction of shift as in FIGS. 2(c) and 2(d), and the homodyne detection signal has an amplitude averagely smaller than that when the synchronization is achieved.

The output signal (the intermediate frequency intensity signal 105a having the same carrier frequency as that of the periodic signal source) of the square-law detector 105 is input to the lock-in amplifier 106, using, as a reference signal, the periodic signal 107b represented as $b \sin\omega_d t$ with the same angular frequency $\omega_d$ as that of the small dither signal 107a. The lock-in amplifier 106 outputs a signal that is proportional to an amplitude of the same frequency and phase component as the reference signal, and thus the low frequency error signal 106a proportional to $-2aE_{LO}^2 E_s^2 \sin 2\delta$ is obtained.

In the vicinity of $\delta=0$, $-2aE_{LO}^2 E_s^2 \sin 2\delta$ is a negative signal in the case of $\delta>0$ and is a positive signal in the case of $\delta<0$. Accordingly, the output signal of the lock-in amplifier 106 is fed back to the phase controller 103 as the error signal (low frequency error signal 106a), so that it is possible to reduce $\delta$ in the case of $\delta>0$ or to increase $\delta$ in the case of $\delta<0$. As a result, $\delta$ converges to zero, and the relative phase between the local oscillator light 101a and the OPO optical pulse 102a can be stabilized. Note that the feedback controller 108 receives, as an input, the low frequency error signal 106a and outputs the feedback signal for synchronization 108a. The feedback signal for synchronization 108a is combined with the small dither signal 107a from the periodic signal source 107 and is input to the phase controller 103.

By using the technique of the present embodiment, it is possible to stabilize the phase synchronization and suppress variation in calculation accuracy with a simple configuration.

Second Embodiment

A second phase synchronization approach for homodyne detection will be described.

For dummy pulses (see FIG. 4 and PTL 1) in an optical fiber ring resonator 201 (FIG. 3), injection light to the optical fiber ring resonator 201 is used to induce a specific phase pattern, and phase modulation is added to local oscillator light 301a before modulation, thereby part of a measurement result of the dummy pulses is directly utilized as an error signal. Note that, for the purpose of explanation, the optical fiber ring resonator is used, but the approach can also be used in the case of an optical resonator using other techniques such as a free space optical system using a lens or a mirror.

Figure 4:
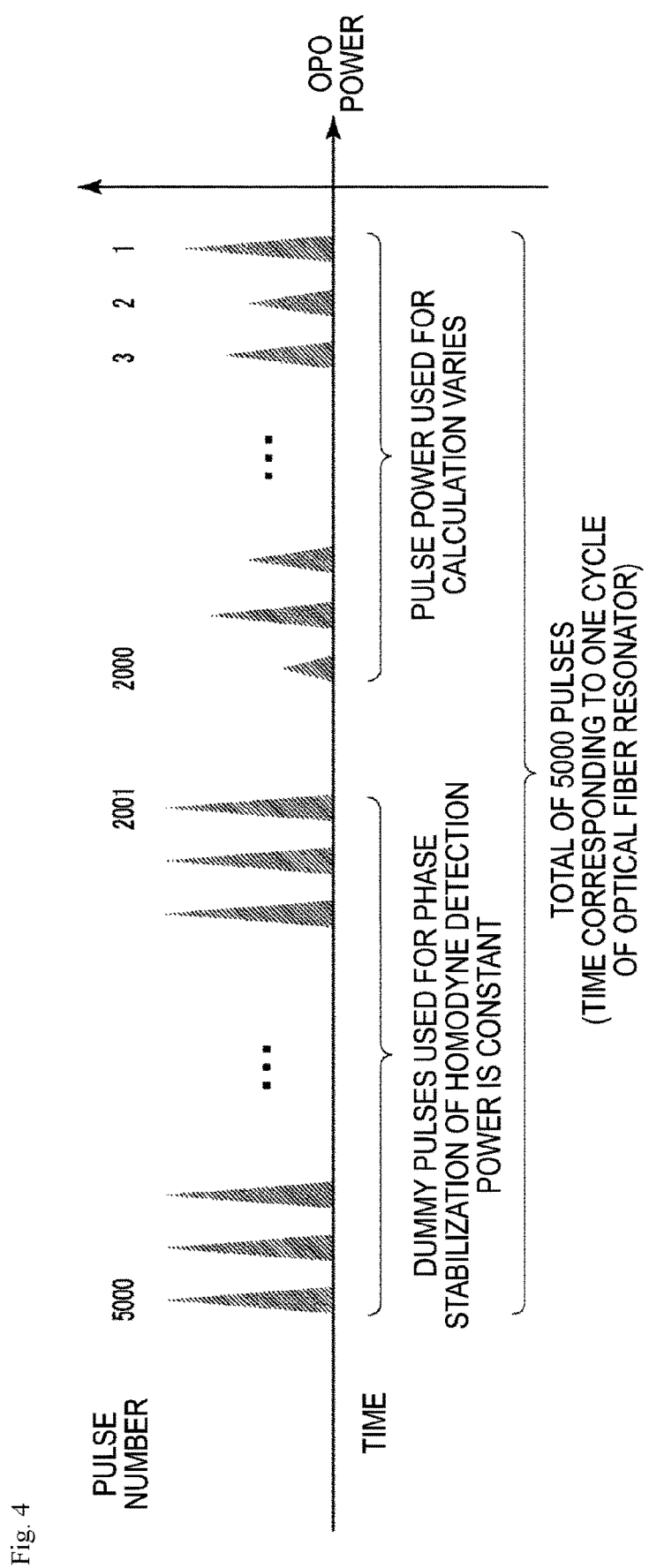
FIG. 4 is a diagram illustrating a breakdown of cycling pulses within a resonator.

FIG. 4 illustrates a breakdown of cycling pulses within the resonator with an OPO power as the vertical axis and time as the horizontal axis. Pulse numbers 1 to 2000 represent pulses that are used for calculation, and the pulse power varies depending on the calculation process. Pulse numbers 2001 to 5000 represent dummy pulses that are used for phase stabilization of homodyne detection, and the pulse power is constant. A total of 5000 pulses correspond to one cycle of the optical fiber resonator.

Figure 3:
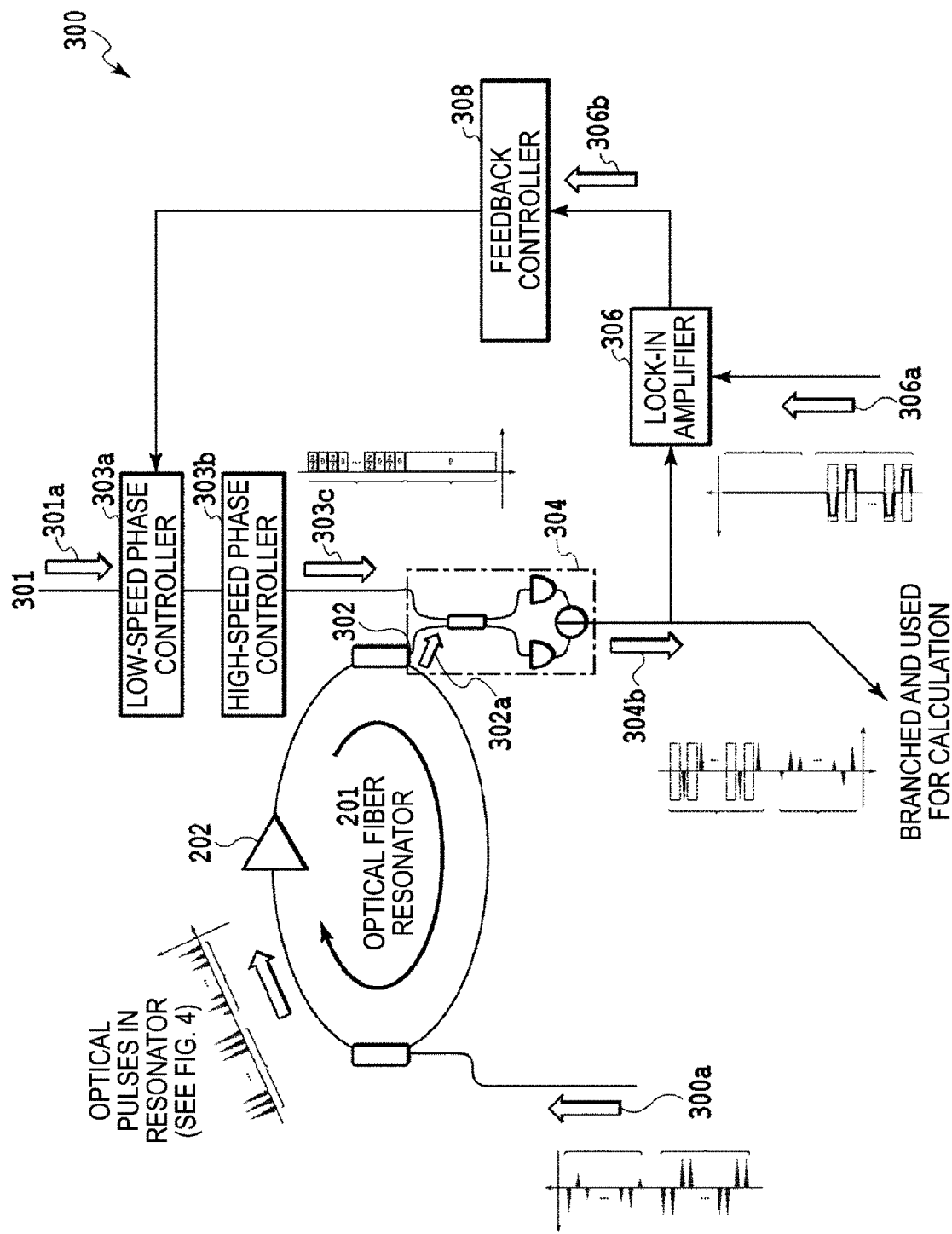
FIG. 3 is a diagram illustrating a configuration of an entire optical system of the phase synchronization device.

In the present embodiment, the phase synchronization device in FIG. 3 is utilized. The configuration of a phase synchronization device 300 will be described below.

The phase synchronization device 300 includes: a low-speed phase controller 303a configured to receive, as an input, the local oscillator light 301a before modulation from a first input unit 301; a high-speed phase controller 303b configured to receive, as an input, a signal from the low-speed phase controller 303a; an optical fiber ring resonator 201 configured to be injected injection light 300a (see FIG. 5) and including a phase sensitive amplifier 202 (optical amplifier in which a gain depends on an optical phase of input signal light); an optical homodyne detector 304 configured to receive, as an input, a signal from a second input unit 302 and local oscillator light after phase modulation 303c (see FIG. 6) from the high-speed phase controller 303b and output a homodyne detection signal 304b including a high frequency error signal (see FIGS. 7 to 9); a lock-in amplifier 306 configured to receive, as an input, the homodyne detection signal 304b including the high frequency error signal and a mask signal 306a (see FIG. 10) for extracting only an error signal and output the low frequency error signal 306b; and a feedback controller 308 configured to receive, as an input, the low frequency error signal 306b and output a signal. Here, the phase synchronization device 300 is configured such that the low-speed phase controller 303a receives the output signal of the feedback controller 308. Note that the homodyne detection signal 304b including the high frequency error signal is branched and is used for calculation. Note that the low-speed phase controller and the high-speed phase controller can switch their arrangement order on an optical path.

Figure 5:
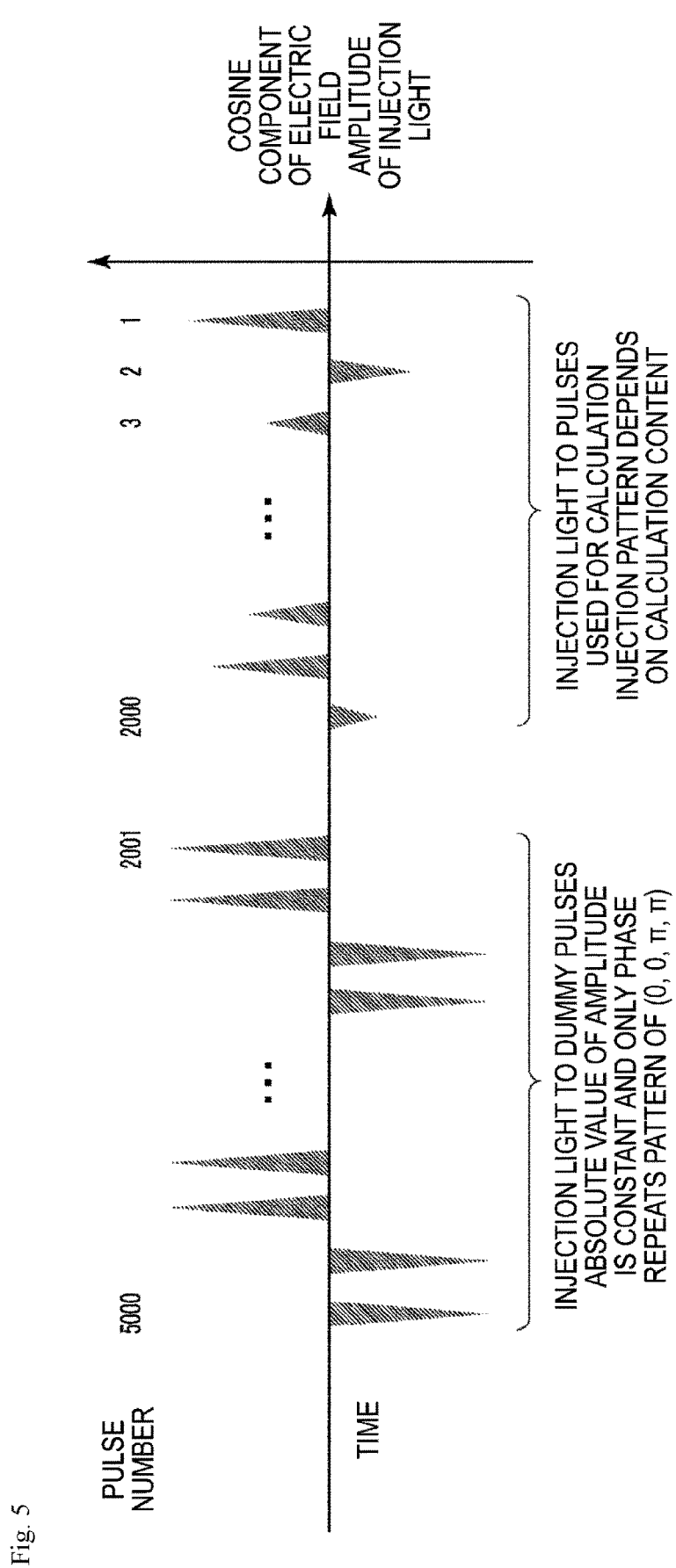
FIG. 5 is a diagram illustrating a modulation pattern of injection light into the resonator.

Specifically, the following operations are combined.
i) Of the injection light 300a from the outside to the inside of the optical fiber ring resonator 201, injection light to the dummy pulse is phase-modulated as in FIG. 5. This causes the dummy pulse within the optical fiber ring resonator 201 to oscillate in the same phase modulation pattern as that of the injection light.

FIG. 5 illustrates a modulation pattern of the injection light into the resonator with a cosine component of an electric field amplitude of the injection light as the vertical axis and time as the horizontal axis. In pulse numbers 1 to 2000, a pattern of the injection light into these pulses used for calculation depends on a calculation content. In pulse numbers 2001 to 5000, an absolute value of an amplitude of the injection light into these dummy pulses is constant and only the phase repeats a pattern of $(0, 0, \pi, \pi)$.
ii) Of the local oscillator light, as in FIG. 6, modulation is performed with a phase of zero at a timing corresponding to a pulse used for calculation and with a phase of $\pi/2$ at a timing corresponding to some dummy pulses.

Figure 6:
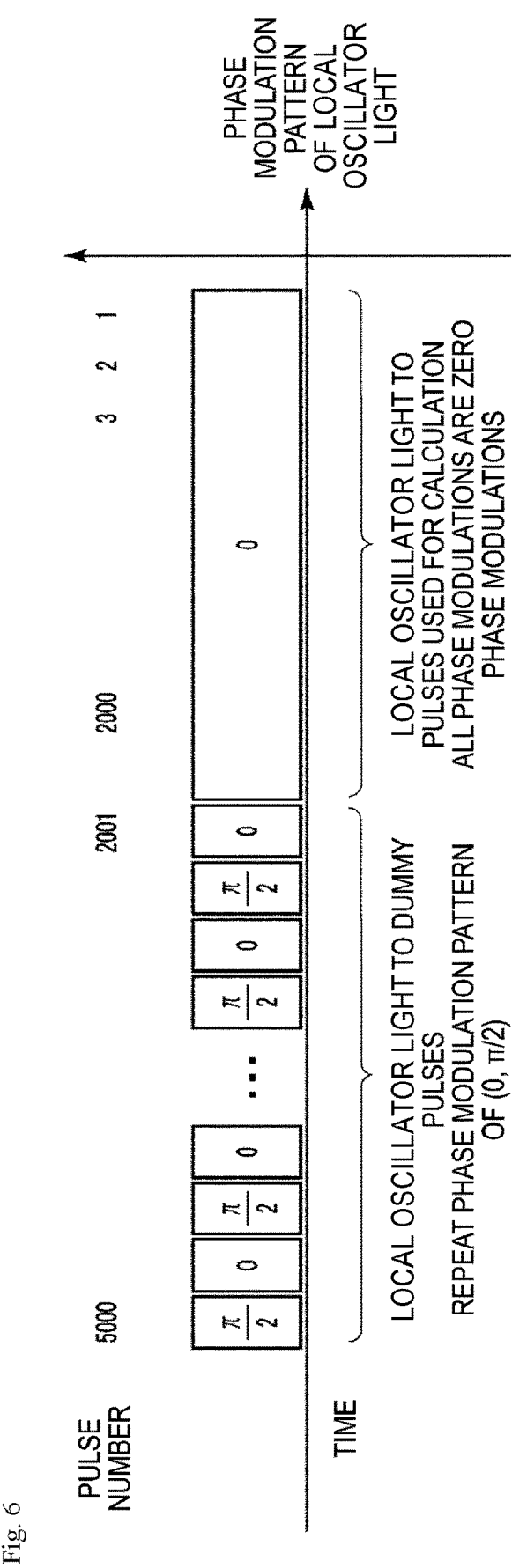
FIG. 6 is a diagram illustrating a phase modulation pattern for local oscillator light.

FIG. 6 illustrates a phase modulation pattern with respect to the local oscillator light with a phase modulation pattern of the local oscillator light as the vertical axis and time as the horizontal axis. In pulse numbers 1 to 2000, all modulations for the local oscillator light to these pulses used for calculation are zero phase modulations. In pulse numbers 2001 to 5000, the local oscillator light to these dummy pulses repeats a phase modulation pattern of $(0, \pi/2)$.

As described in the first embodiment, the output signal of homodyne detection is represented as $2E_{LO}E_s \cos \theta$. As to the homodyne detection signal at the timing when $\pi/2$ phase modulation is performed, $\theta$ is $\pi/2$ when there is no phase shift, and thus phase synchronization is achieved when the signal becomes zero. On the other hand, when there is a phase shift of $\theta=\pi/2+\delta$, $\cos \theta=-\sin \delta$ holds, resulting in a high frequency signal having a voltage dependent on the direction of the phase shift and the sign of $E_s=\pm E_{opo}$. (FIGS. 7 to 9).

Figure 7:
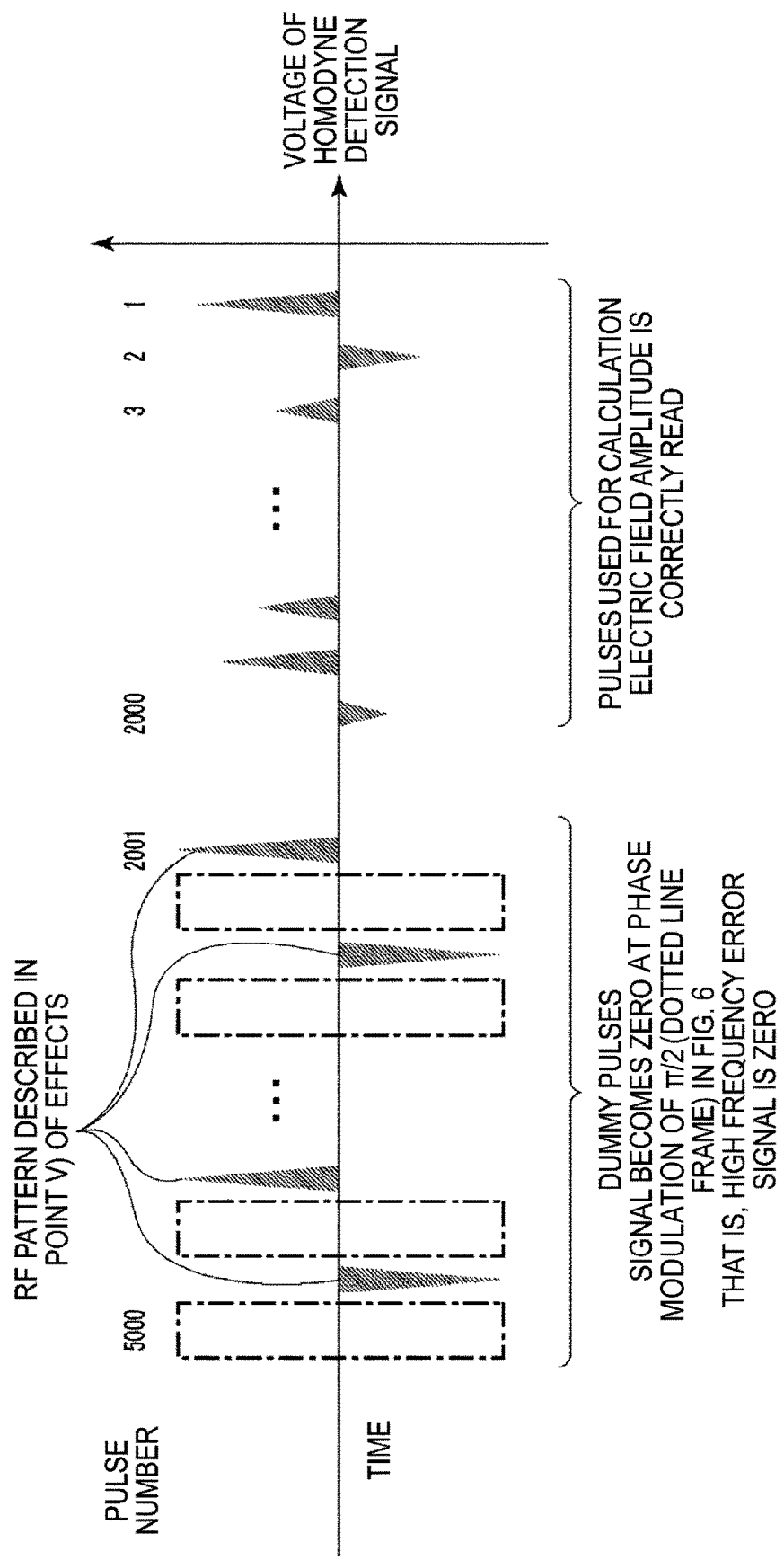
FIG. 7 is a diagram illustrating a homodyne detection signal when the phase is synchronized.

FIG. 7 illustrates the homodyne detection signal when the phase is synchronized with a voltage of the homodyne detection signal as the vertical axis and time as the horizontal axis. In pulse numbers 1 to 2000, the cosine component of the pulse electric field amplitude used for calculation can be read correctly. In the dummy pulses of pulse numbers 2001 to 5000, the signal becomes zero at the timing of $\pi/2$ modulation (dotted line frame) in FIG. 6, that is, a high frequency error signal becomes zero.

Figure 8:
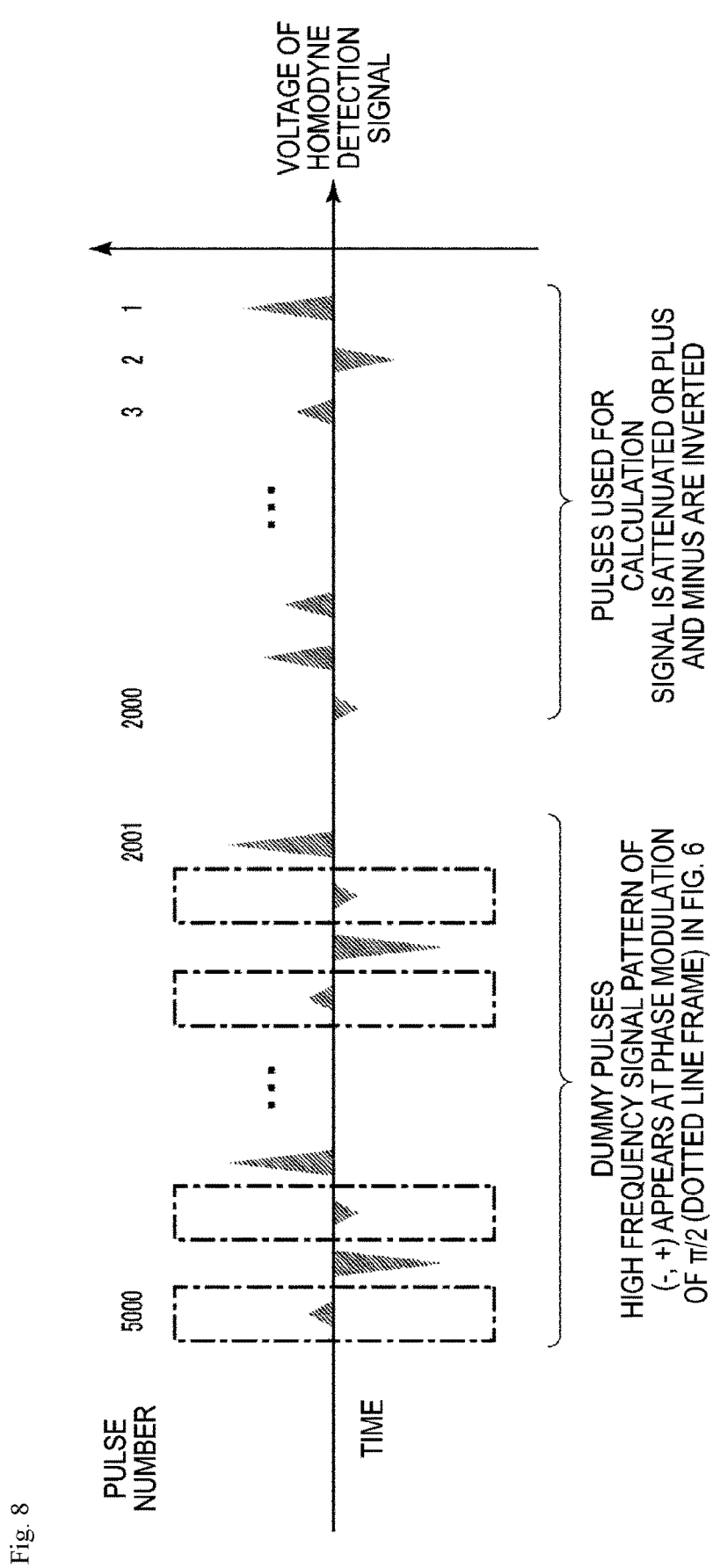
FIG. 8 is a diagram illustrating the homodyne detection signal when the phase is shifted in the positive direction.

FIG. 8 illustrates the homodyne detection signal when the phase shifts in the positive direction with a voltage of the homodyne detection signal as the vertical axis and time as the horizontal axis. In pulse numbers 1 to 2000, these pulse signals used for calculation are attenuated or their plus and minus are inverted. In dummy pulses of pulse numbers 2001 to 5000, a high frequency signal pattern of (−, +) appears at the timing of $\pi/2$ modulation in FIG. 6 (dotted line frame).

Figure 9:
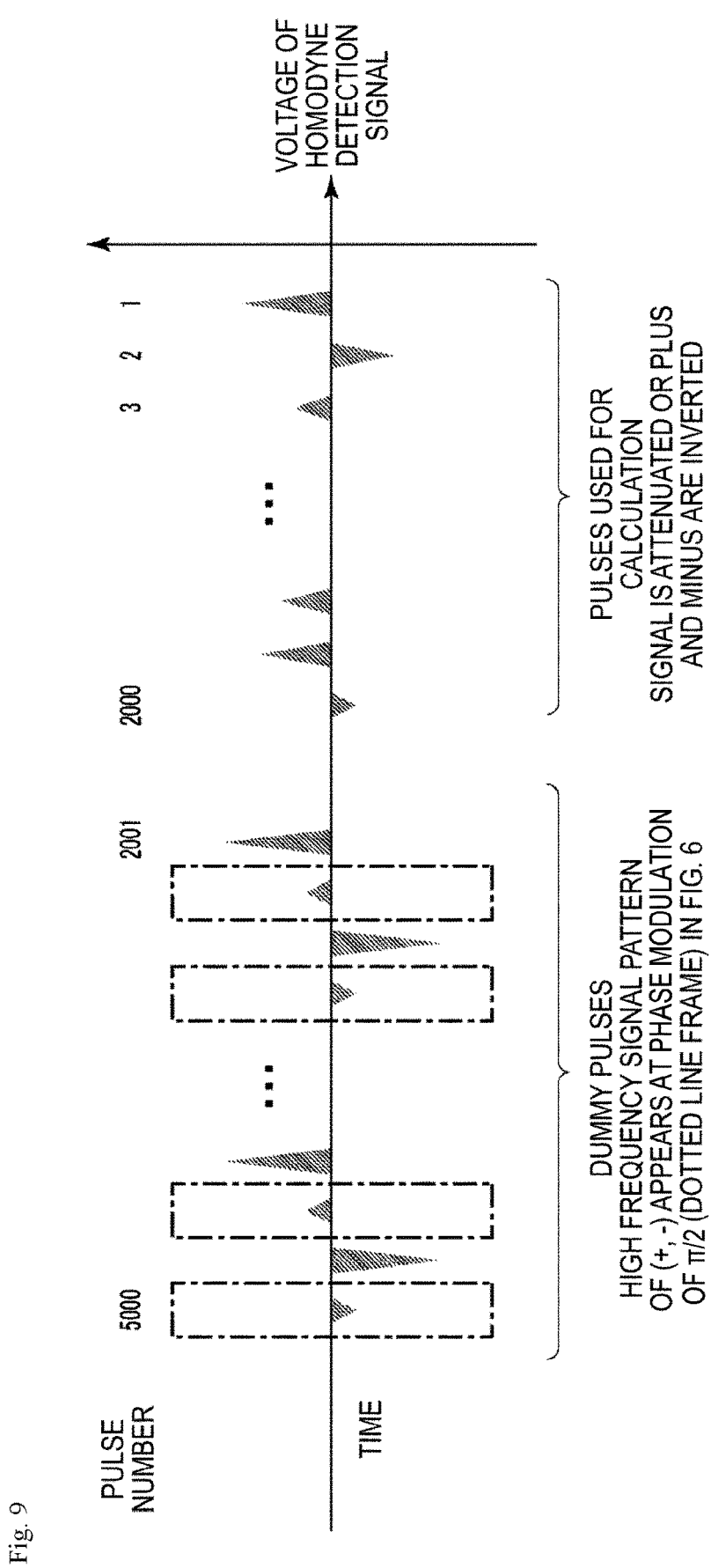
FIG. 9 is a diagram illustrating the homodyne detection signal when the phase is shifted in the negative direction.

FIG. 9 illustrates the homodyne detection signal when the phase shifts in the negative direction with a voltage of the homodyne detection signal as the vertical axis and time as the horizontal axis. In pulse numbers 1 to 2000, these pulse signals used for calculation are attenuated or their plus and minus are inverted. In the dummy pulses of pulse numbers 2001 to 5000, a high frequency signal pattern of (+, −) appears at the timing of $\pi/2$ modulation (dotted line frame) in FIG. 6.

Figure 10:
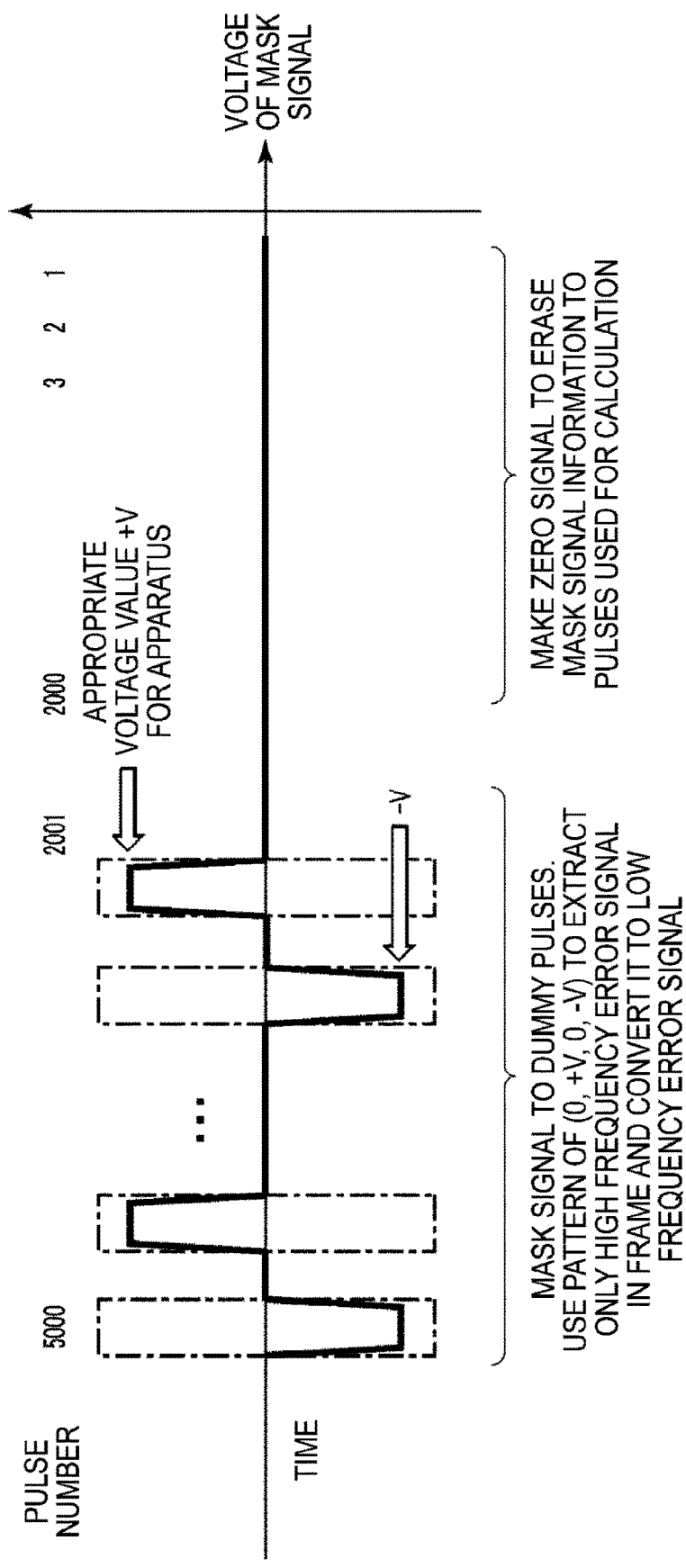
FIG. 10 is a diagram illustrating a mask signal for acquiring only an error signal.

FIG. 10 illustrates a mask signal for acquiring only an error signal with a voltage of the mask signal as the vertical axis and time as the horizontal axis. In pulse numbers 1 to 2000, the value of the mask signal is set to zero in order to erase information of these pulses used for calculation from the high frequency error signal. FIG. 10 illustrates the mask signal to the dummy pulses in pulse numbers 2001 to 5000. A pattern of (0, +V, 0, −V) is used to extract only the high frequency error signal in the dotted line frame and convert it to a low frequency error signal.

The homodyne detection signal is branched and the mask signal as in FIG. 10 is input as a reference signal to the lock-in amplifier 306. Inside the lock-in amplifier 306, two input signals (the homodyne detection signal 304b including the high frequency error signal and the mask signal 306a for extracting only the error signal) are multiplied. Thereby, the pulse for calculation is multiplied by zero and the dummy pulse subjected to π/2 phase modulation is multiplied by the mask signal of ±V depending on the sign of $E_s = \pm E_{opo}$. Accordingly, the output signal (low frequency error signal 306b) of the lock-in amplifier 306 becomes an output proportional to $-E_{LO}E_{opo}V \sin \delta$, and a signal whose polarity of plus and minus is determined not by $\sin 2\delta$ but by $\sin \delta$ can be obtained. When this error signal (low frequency error signal 306b) is used to perform feedback by the feedback controller 308, synchronization with only δ=0 is achieved.

Effects of the invention in the present embodiment will be described below.
  i) Induction of a phase pattern to optical pulses in a resonator and phase modulation to local oscillator light are combined, thereby it is possible to achieve synchronization not with either phase of zero or π but surely with only the phase of zero.
  ii) Induction of the phase pattern and modulation of the local oscillator light are performed only for dummy pulses, thereby it is possible to eliminate superimposition of an excess signal on a pulse used for calculation.
  iii) A mask signal with three values is used to remove the signal used for calculation from an error signal, thereby it is possible to acquire an error signal that is not affected by a calculation process.
  iv) Part of the dummy pulses is used directly as the error signal, thereby it is possible to acquire an error signal having a high signal-to-noise ratio.
  v) A pattern is configured such that some dummy pulses are observed as a high frequency pattern even in a state where phase is synchronized, thereby it is possible to reduce a pattern effect due to an electrical component removing direct current component used in a homodyne detection system.

Third Embodiment

A third phase synchronization approach for homodyne detection will be described.

The third phase synchronization approach can improve phase synchronization stability when the number of pulses used for calculation is small in a small-scale problem. For the purpose of explanation, specific numbers are given.

In a case where the number of all optical pulses is 5000 and the number of optical pulses capable of being used for calculation by a calculator is 2000, when the number of pulses used for calculation may be less than 2000 from the nature of a problem, pulses that are not used are also used as dummy pulses, so that it is possible to improve phase synchronization stability.

For example, when only 1000 pulses or less are used for calculation, dummy pulses used for phase synchronization are dispersedly arranged to obtain a signal in which pulses for calculation and the dummy pulses are, for example, alternately arranged when the synchronization is achieved (FIG. 14), it is possible to use an electrical filter having a narrower band just in front of a measurement circuit for calculation. Accordingly, the pulse width can be broadened, so that it is possible to reduce the effect of a measurement timing error or the like and improve measurement accuracy.

Hereinafter, FIGS. 11 to 17 each illustrate a signal pattern when only 1000 pulses among 2000 pulses are utilized for calculation, as an example. In particular, a portion different from those of FIGS. 2 to 8 above is indicated by a line frame.

Figure 11:
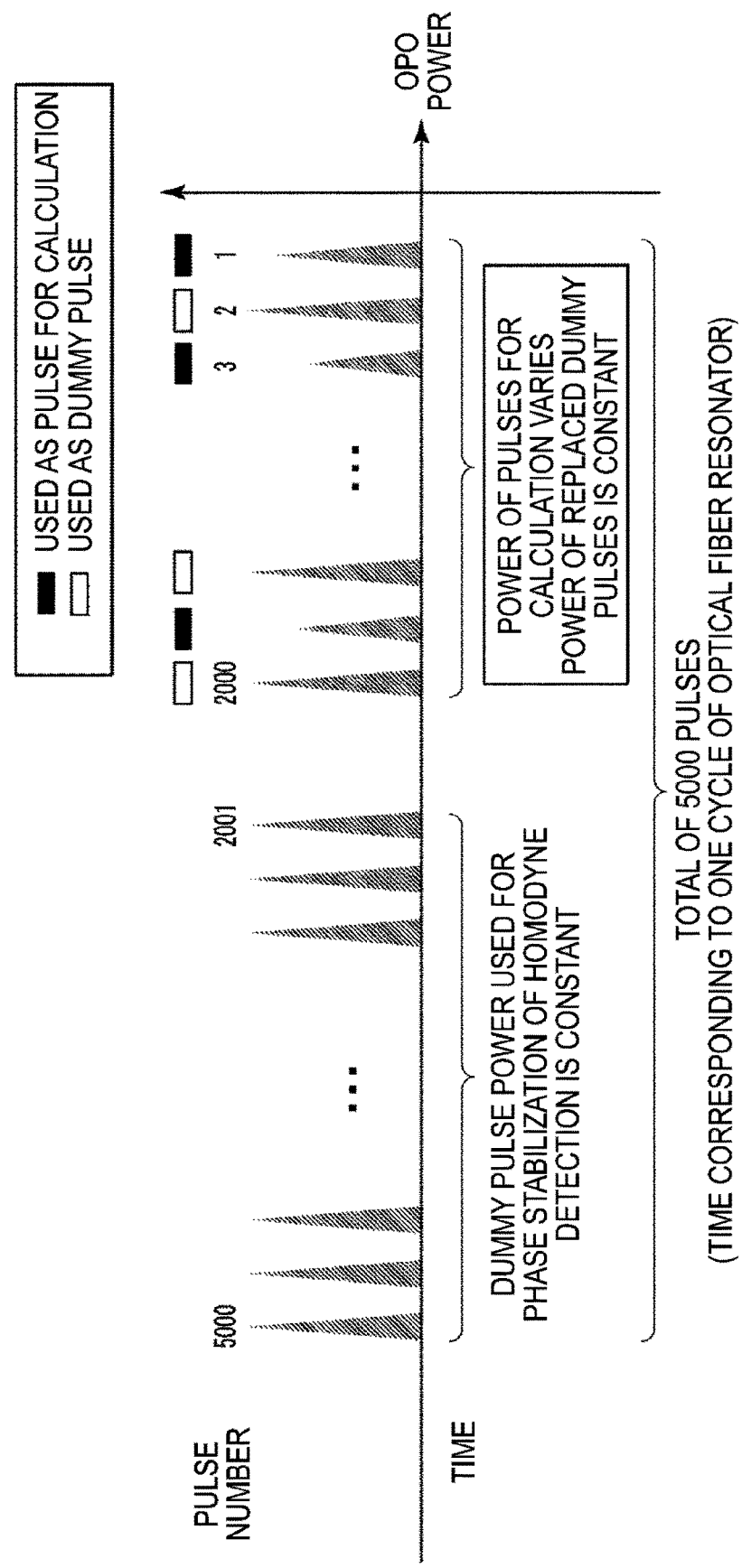
FIG. 11 is a diagram illustrating a breakdown of cycling pulses within the resonator.

FIG. 11 illustrates a breakdown of cycling pulses within a resonator with an OPO power as the vertical axis and time as the horizontal axis. In pulse numbers 1 to 2000, powers of the pulses for calculation vary and powers of replaced dummy pulses are constant. In pulse numbers 2001 to 5000, powers of dummy pulses for phase stabilization of homodyne detection are constant. A total of 5000 pulses correspond to one cycle of the optical fiber resonator. Note that, in pulse numbers 1 to 2000, odd-numbered pulses are used as pulses for calculation, and even-numbered pulses are used as dummy pulses.

Figure 12:
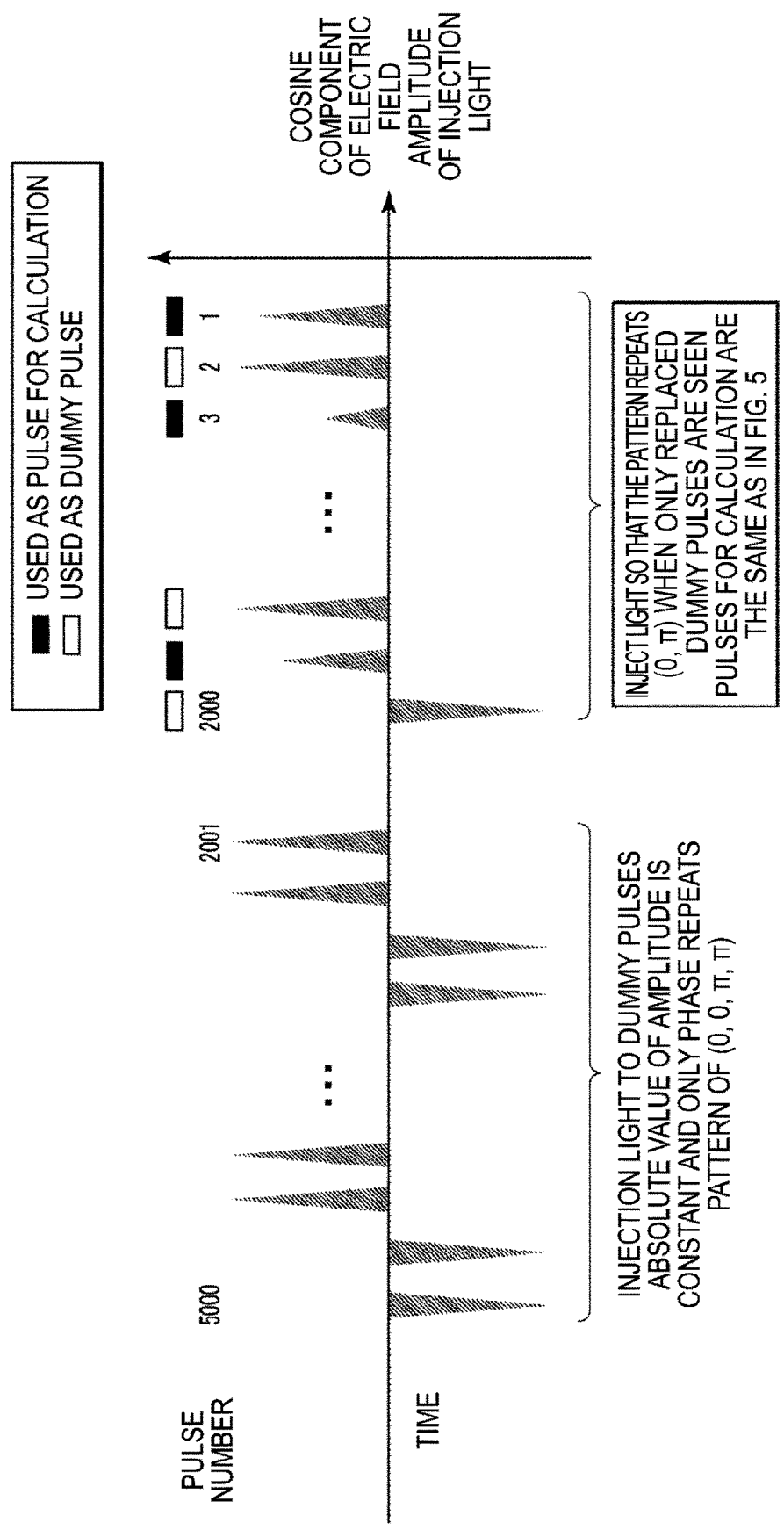
FIG. 12 is a diagram illustrating a modulation pattern of injection light into the resonator.

FIG. 12 illustrates a modulation pattern of the injection light into the resonator with a cosine component of the electric field amplitude of the injection light as the vertical axis and time as the horizontal axis. In pulse numbers 1 to 2000, when only the replaced even-numbered dummy pulses are seen, the light is injected so as to repeat the pattern of (0, π). The pulses for calculation are the same as in FIG. 5. Note that odd-numbered pulses are used as the pulses for calculation, and even-numbered pulses are used as the dummy pulses. In pulse numbers 2001 to 5000, the injection light into the dummy pulses is illustrated, absolute values of amplitudes are constant, and only the phase repeats the pattern of (0, 0, π, π).

Figure 13:
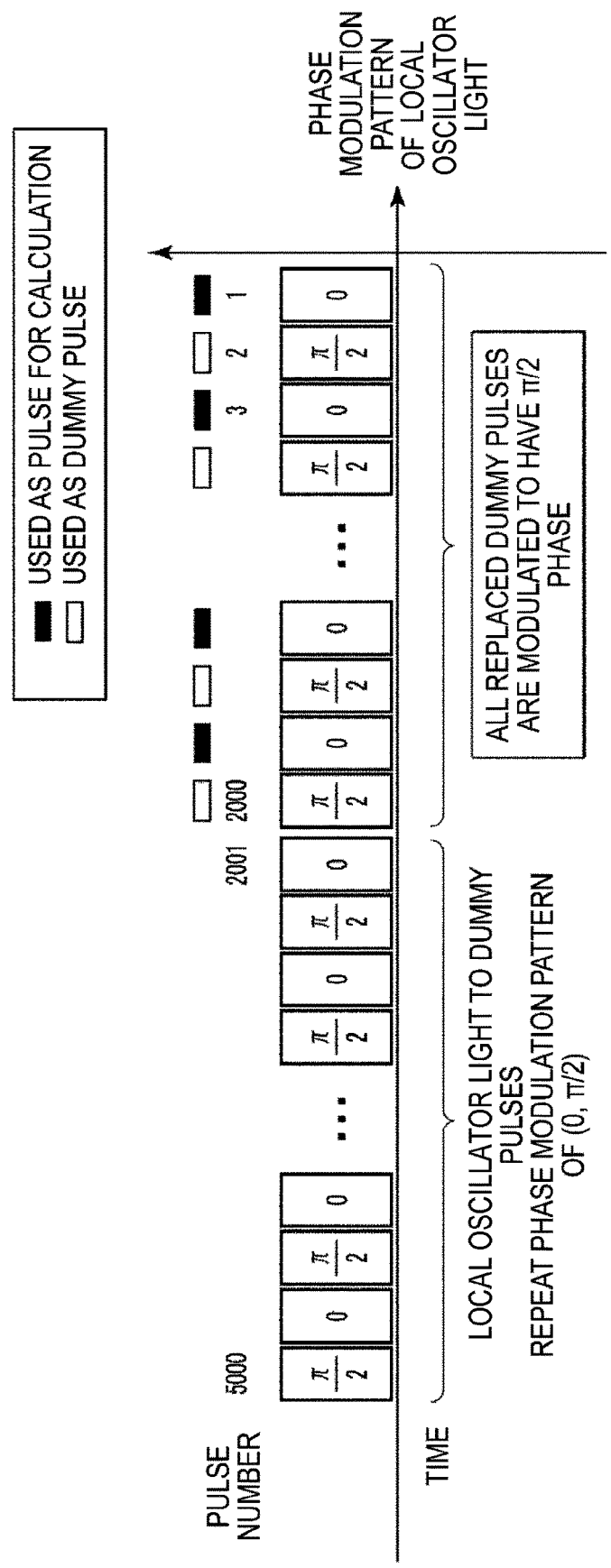
FIG. 13 is a diagram illustrating a phase modulation pattern for local oscillator light.

FIG. 13 illustrates a phase modulation pattern for the local oscillator light with a phase modulation pattern of the local oscillator light as the vertical axis and time as the horizontal axis. In pulse numbers 1 to 2000, all of the replaced even-numbered dummy pulses are modulated so as to have a phase of π/2. Note that odd-numbered pulses are used as the pulses for calculation, and even-numbered pulses are used as the dummy pulses. In numbers 2001 to 5000, the phase modulation to the local oscillator light corresponding to the dummy pulses repeats the pattern of (0, π/2, 0, π/2).

Figure 14:
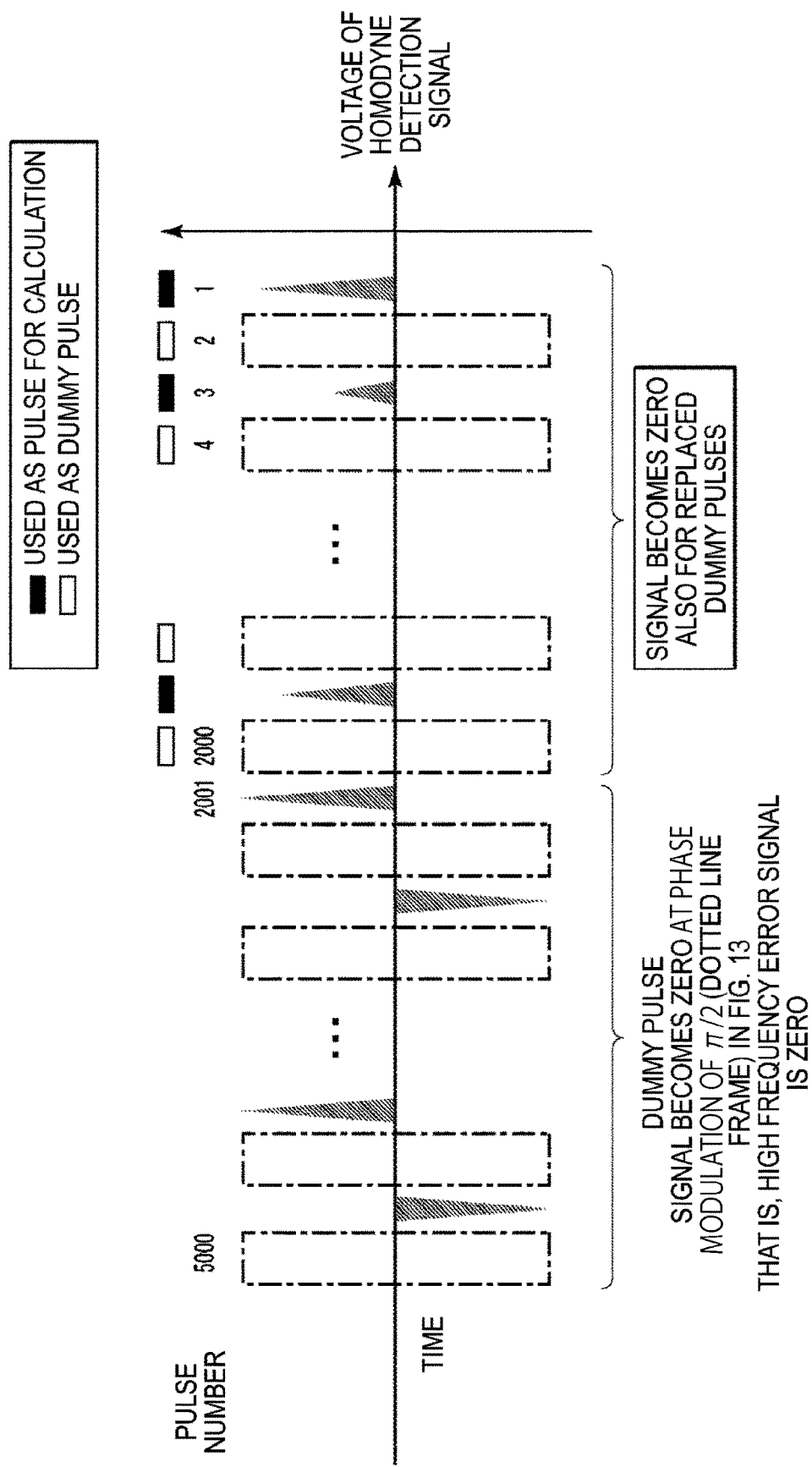
FIG. 14 is a diagram illustrating a homodyne detection signal when the phase is synchronized.

FIG. 14 illustrates a homodyne detection signal when the phase is synchronized with a voltage of the homodyne detection signal as the vertical axis and time as the horizontal axis. In pulse numbers 1 to 2000, the signal becomes zero in the replaced dummy pulses. Note that odd-numbered pulses are used as the pulses for calculation, and even-numbered pulses are used as the dummy pulses. In numbers 2001 to 5000, for the dummy pulses, the signal becomes zero at a timing of π/2 modulation (dotted line frame) in FIG. 13, that is, the high frequency error signal is zero.

Figure 15:
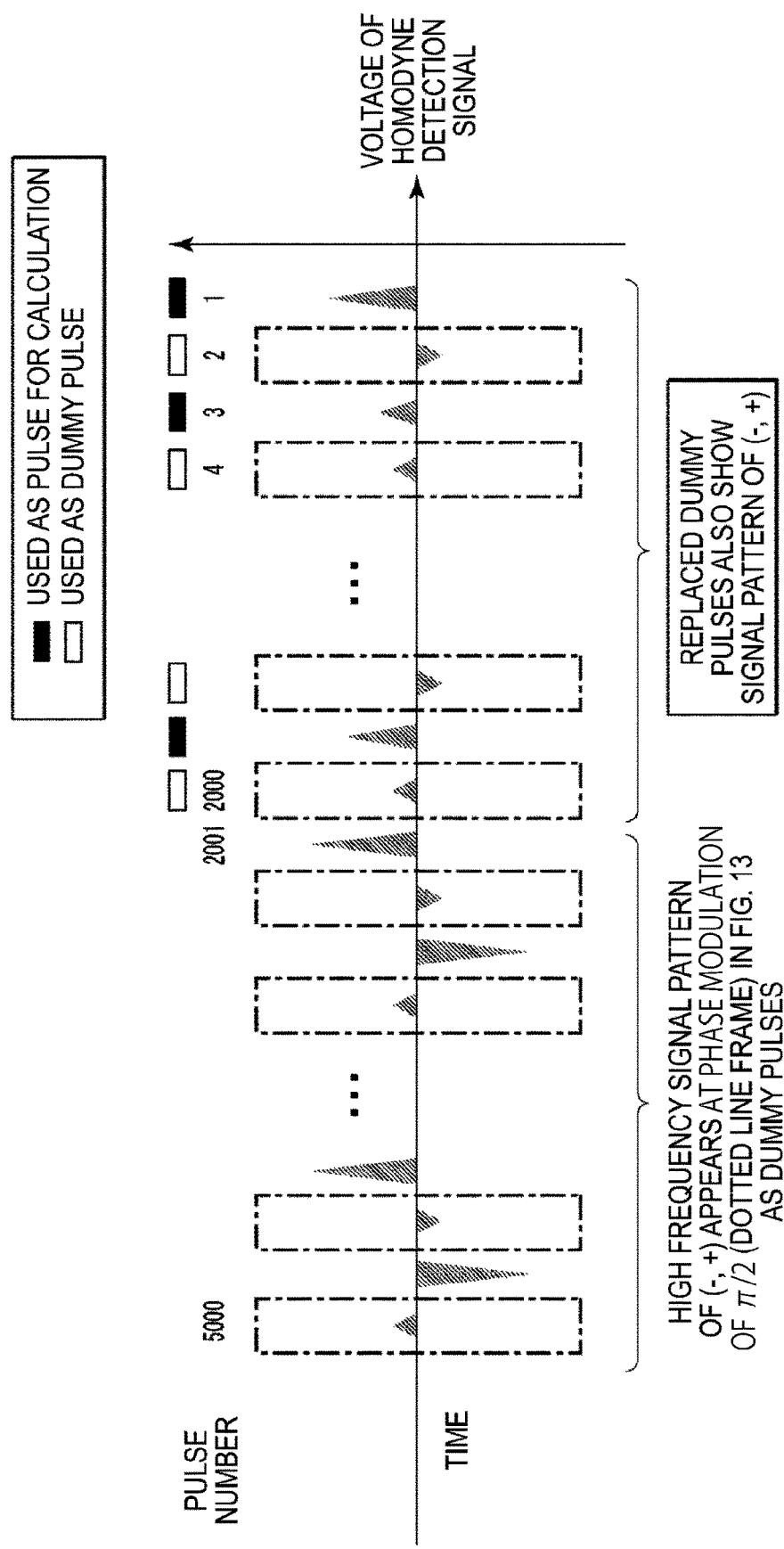
FIG. 15 is a diagram illustrating the homodyne detection signal when the phase is shifted in the positive direction.

FIG. 15 illustrates the homodyne detection signal when the phase shifts in the positive direction with a voltage of the homodyne detection signal as the vertical axis and time as the horizontal axis. In pulse numbers 1 to 2000, the replaced dummy pulses also show the signal pattern of (−, +). Note that odd-numbered pulses are used as the pulses for calculation, and even-numbered pulses are used as the dummy pulses. In numbers 2001 to 5000, for the dummy pulses, the signal pattern of (−, +) appears at the timing of π/2 modulation (dotted line frame) in FIG. 13.

Figure 16:
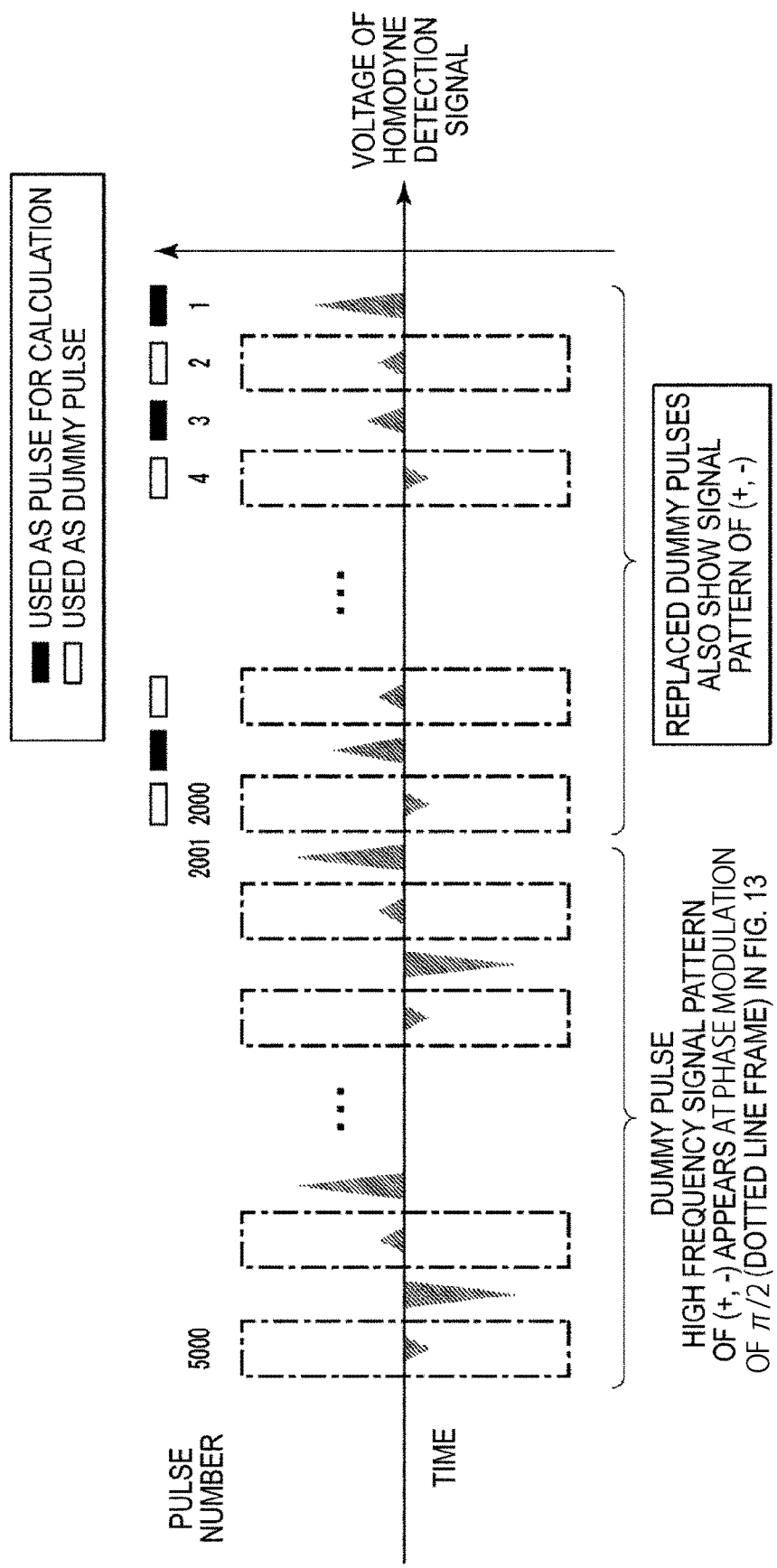
FIG. 16 is a diagram illustrating the homodyne detection signal when the phase is shifted in the negative direction.

FIG. 16 illustrates the homodyne detection signal when the phase shifts in the negative direction with a voltage of the homodyne detection signal as the vertical axis and time as the horizontal axis. In pulse numbers 1 to 2000, the replaced dummy pulses also show the signal pattern of (+, −). Note that odd-numbered pulses are used as the pulses for calculation, and even-numbered pulses are used as the dummy pulses. In numbers 2001 to 5000, for the dummy pulses, the signal pattern of (+, −) appears at the timing of π/2 modulation (dotted line frame) in FIG. 13.

Figure 17:
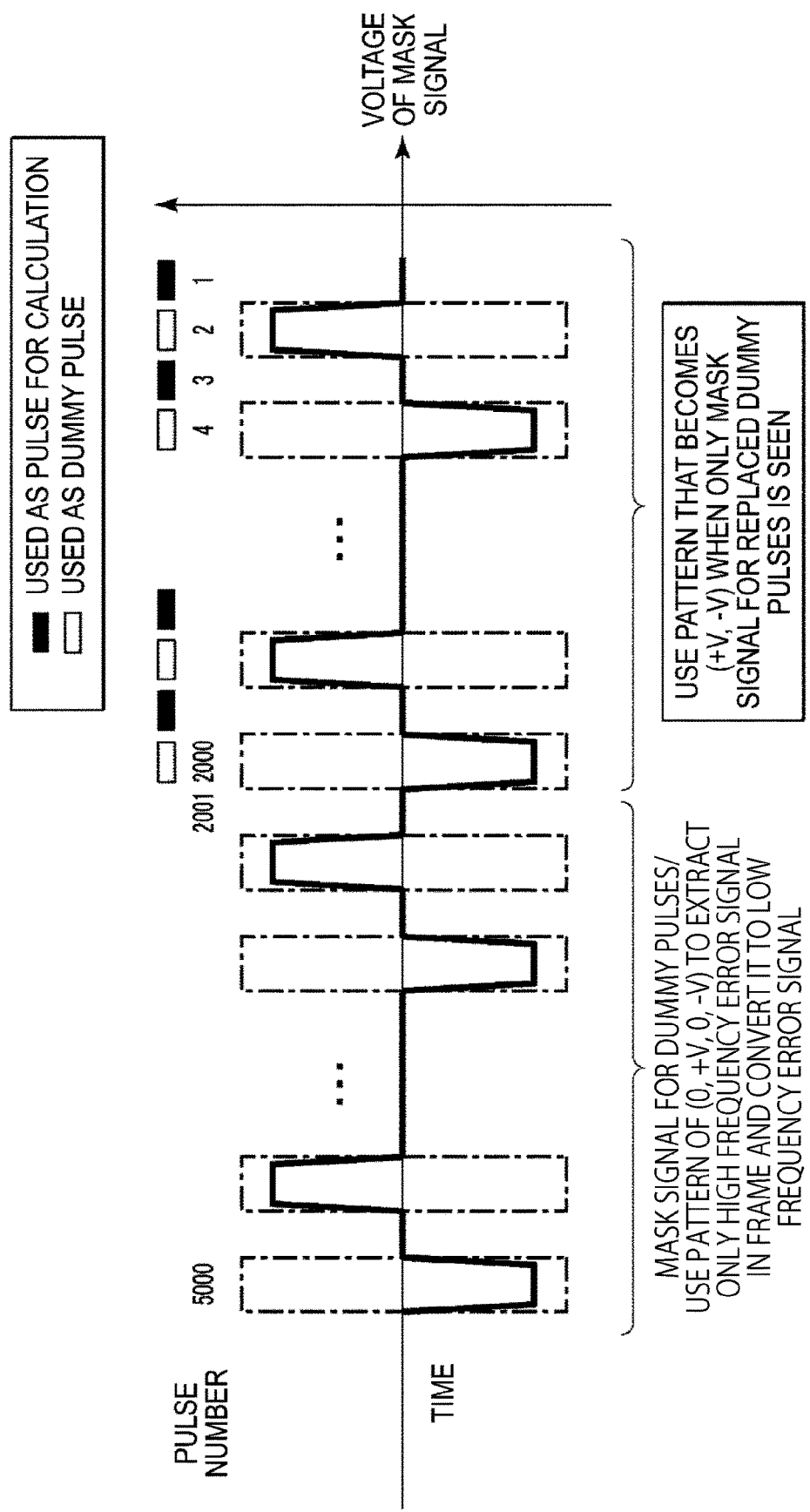
FIG. 17 is a diagram illustrating a mask signal for acquiring only an error signal.

FIG. 17 illustrates a mask signal for acquiring only an error signal, with a voltage of the mask signal as the vertical axis and time as the horizontal axis. In pulse numbers 1 to 2000, a pattern that takes (+V, −V) when only the mask signal for the replaced dummy pulses is seen is used. Note that odd-numbered pulses are used as the pulses for calculation, and even-numbered pulses are used as the dummy pulses. In numbers 2001 to 5000, regarding the mask signal to the dummy pulses, a pattern of (0, +V, 0, −V) is used to extract only the high frequency error signal in the dotted line frame and convert it to the low frequency error signal.

Specific numbers have been used in the above description, but can be generalized as described below. The total number of optical pulses cycling within the ring is defined as N (N is a natural number). Of the optical pulses, the number of optical pulses capable of being used for calculation is defined as M (an integer of two or greater). When a problem is small size and only needs to use L optical pulses (L≤0.5 M and L is a natural number), M−L optical pulses originally for calculation can also be used for the dummy pulses for phase synchronization.

Furthermore, when the dummy pulses used for phase synchronization are dispersedly arranged in the pulses for calculation, a narrow-band electrical filter can be used, so that the measurement accuracy can be improved.

Fourth Embodiment

For the pulses in FIGS. 4 to 10 or FIGS. 11 to 17, phase synchronization is possible in all patterns in which a set of (value of injection light, value of phase modulation for local oscillator light, value of mask signal) of any i-th pulse and any j-th pulse is permuted. In particular, when there is a particular limitation in the frequency band of the lock-in amplifier or a device generating these modulation signals, it is possible to adjust at least one or both of the carrier frequencies of the high frequency error signal and the mask signal pattern within a range that can be achieved by permutation of pulses. That is, it is possible to adjust the frequencies to the optimal values for the system and to achieve the maximum performance.

Note that essential point is that the phase difference becomes π/2 for the modulation patterns in FIG. 6 and FIG. 13, and the same synchronization can be realized with modulation of zero or −π/2. In this case, the polarity of the error signal is inverted, and thus +V and −V of the mask signal only needs to be inverted.

INDUSTRIAL APPLICABILITY

The present disclosure can be applied to the technical field of phase synchronization approaches of homodyne detection for a calculator using a degenerate parametric oscillator.

The invention claimed is:

1. A phase synchronization method comprising:

inputting local oscillator light and an optical pulse of an optical parametric oscillator to a first input unit and a second input unit of an optical homodyne detector, respectively;

using an optical homodyne detection signal of the optical homodyne detector to acquire an error signal; and adding a phase modulation signal to the local oscillator light to control a phase shift between the local oscillator light and the optical pulse of the optical parametric oscillator.

2. The phase synchronization method according to claim 1, wherein the error signal is proportional to sin 2δ when the phase shift between the local oscillator light and the optical pulse of the optical parametric oscillator is defined as δ.

3. The phase synchronization method according to claim 1, further comprising using injection light to induce a particular phase pattern in dummy pulses in the optical parametric oscillator, wherein the error signal is part of a measurement result of the dummy pulses.

4. The phase synchronization method according to claim 3, further comprising permutating a set of the pulses, wherein the permutation adjusts at least one or both of carrier frequencies of a high frequency error signal and a mask signal pattern.

5. The phase synchronization method according to claim 1, further comprising when an upper limit of the number of optical pulses capable of being used for calculation is M (M is an integer of two or greater) and the number of optical pulses actually required for calculation is L (L≤0.5 M and L is a natural number), dispersedly arranging M−L optical pulses as dummy pulses for phase synchronization in the M optical pulses.

6. A phase synchronization device comprising:

an optical homodyne detector into which local oscillator light and an optical pulse of an optical parametric oscillator are input from a first input unit and a second input unit, respectively;

a lock-in amplifier configured to use an optical homodyne detection signal from the optical homodyne detector to output an error signal; and a phase controller provided between the first input unit and the optical homodyne detector and configured to acquire the error signal and add a phase modulation signal to the local oscillator light to control a phase shift.

7. The phase synchronization device according to claim 6, further comprising a periodic signal source, wherein the error signal is obtained by performing lock-in detection between a signal obtained by subjecting the optical homodyne detection signal to a square-law detector and a continuous periodic signal output by the periodic signal source.

8. The phase synchronization device according to claim 6, wherein
the optical parametric oscillator is configured to use injection light to induce a particular phase pattern in dummy pulses in the optical parametric oscillator, and
the error signal is a part of a measurement result of the dummy pulses.

* * * * *